(12) United States Patent
Craig

(10) Patent No.: US 12,729,287 B2
(45) Date of Patent: Sep. 8, 2026

(54) COMPOSITE BIOMASS MATERIALS AND SYSTEMS AND METHODS FOR MAKING SAME

(71) Applicant: Hugh Craig, Sedona, AZ (US)

(72) Inventor: Hugh Craig, Sedona, AZ (US)

( * ) Notice: Subject to any disclaimer, the term of this patent is extended or adjusted under 35 U.S.C. 154(b) by 378 days.

(21) Appl. No.: 18/614,258

(22) Filed: Mar. 22, 2024

(65) Prior Publication Data

US 2024/0317977 A1 Sep. 26, 2024

Related U.S. Application Data

(60) Provisional application No. 63/492,175, filed on Mar. 24, 2023.

(51) Int. Cl.
*C08L 1/02* (2006.01)
*C08L 97/00* (2006.01)

(52) U.S. Cl.
CPC ............... *C08L 1/02* (2013.01); *C08L 97/005* (2013.01); *C08L 2201/02* (2013.01)

(58) Field of Classification Search
CPC ...... C08L 1/02; C08L 97/005; C08L 2201/02; C08L 97/02
See application file for complete search history.

(56) References Cited

U.S. PATENT DOCUMENTS

2021/0285155 A1* 9/2021 Tudman .................. D21B 1/34

FOREIGN PATENT DOCUMENTS

EP 3872172 A1 * 9/2021 ............. C12P 19/14

* cited by examiner

*Primary Examiner* — Pamela H Weiss
(74) *Attorney, Agent, or Firm* — AVEK IP, LLC

(57) ABSTRACT

A composition for forming a composite material includes cellulose, nano-cellulose, lignin, graphene, and a polymer. A method for producing composite products from waste materials includes providing a waste biomass material, the biomass material comprising cellulose, lignin, and hemicellulose; converting portions of the biomass material into nanocellulose, graphene, and bio-resin; mixing the cellulose, lignin, hemicellulose, nanocellulose, graphene, and bio-resin to form a composite material; forming a composite product from the composite material.

11 Claims, 6 Drawing Sheets

$H_3CO(O)C$ — $NH_2$ methyl 5-(aminomethyl)-2-furoate hydrogenation $H_3CO(O)C$ — $NH_2$ methyl 5-(aminomethyl)-2-tetrahydrofuroate polycondensation H—[NH … C(=O)]n—$OCH_3$ Polyamide hydrodeoxygenation H—[NH … C(=O)]n—$OCH_3$ Nylon 6

COMPOSITE BIOMASS MATERIALS AND SYSTEMS AND METHODS FOR MAKING SAME

CROSS-REFERENCE TO RELATED APPLICATIONS

This application claims the benefit of priority of U.S. Provisional Patent Application No. 63/492,175, filed Mar. 24, 2023, entitled SUPERWOOD.

FIELD OF THE INVENTION

This invention relates to novel composite materials utilizing forest and agricultural waste products, and manufacturing methods to produce such novel composite materials.

BACKGROUND OF THE INVENTION

As described in detail herein, the inventive composite material is at least primarily based on the principal components of wood, cellulose, lignin, and hemicellulose (see FIG. 1). Cellulose provides structural strength for trees and plants as is the largest natural polymer on earth. Cellulose is closely followed by lignin. Cellulose is a basic material for producing paper products and is commonly extracted from softwood. Lignin is commonly thought of as the glue that holds cellulose intact.

Recent work with cellulose has separated this material into its principal components: cellulose nanocrystals and cellulose nanofibers which have extremely high mechanical properties. This process is generally illustrated in FIG. 2. Producing this nano cellulose has in the past been difficult and expensive, but a new process has been developed which simplifies the process and lowers the process cost. This process is illustrated in the attached drawings.

Lignin has principally been considered a waste material in paper mills and has been burned to produce heat and energy. Recent research has shown that lignin can be converted to graphene with a simple thermal process (FIG. 3), and other research has produced several thermoplastics and thermoset bio-polymers.

Hemicellulose, which is generally shown in FIG. 4, is the other principal component of wood, and is currently being developed into biopolymers that may replace polymers that are based on fossil fuels. Hemicellulose is principally glucose and has applications as a food additive.

Four million acres of dead and dying forests exist in the Western United States and Canada due to the Pine Beetle. The harm to the trees has a strong effect on climate and global warming in that the trees can no longer sequester Carbon Dioxide and the decomposition of these trees produces additional Carbon Dioxide. The decomposition of forest waste caused by the lumber industry is also a potent source of CO2.

Waste materials are currently burned for fuel, as noted above, which also produces significant quantities of greenhouse gases while creating conditions that are conducive to wildfires. Finding a solution to these problems led to the potential of developing a nano-reinforced wood product that could reduce the harmful decomposition of dead trees and forest waste while preserving other trees from being harvested for lumber. Utilization of this new material fulfills two major goals: major reduction of greenhouse gases; and production of stronger housing and infrastructure that is not susceptible to severe damage and failure caused by the increased power of natural disasters due to the warmer climate.

We can already recognize the devasting effects of Global Warming with the increase in the power of hurricanes and tornadoes that are causing more and more severe damage to our infrastructure and dwellings. Hurricanes will keep growing stronger. Due to increased greenhouse gas emissions, the air is able to hold onto more moisture, and the oceans are warming, creating the perfect storm. A May 2018 study in the *Journal of Climate* estimates that if Hurricane Ike—which tore apart Galveston, Texas, in 2008—were to occur in the late 21st century, it would be 34 percent wetter, and its winds would be 13 percent stronger.

Wildfires are getting larger, more intense, and more frequent and are almost impossible to control. The near future demands a solution that not only provides stronger materials that will not burn; but will also make a major contribution to the control of global warming.

SUMMARY OF THE INVENTION

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

According to an embodiment of the invention, a composition for forming a composite material includes cellulose, nano-cellulose, lignin, graphene, and a polymer.

According to another embodiment, a method for producing composite products from waste materials includes providing a waste biomass material, the biomass material comprising cellulose, lignin, and hemicellulose; converting portions of the biomass material into nanocellulose, graphene, and bio-resin; mixing the cellulose, lignin, hemicellulose, nanocellulose, graphene, and bio-resin to form a composite material; forming a composite product from the composite material.

BRIEF DESCRIPTION OF THE DRAWINGS

FIG. 3 is an illustration of graphene that has been laser processed.

DESCRIPTION OF THE INVENTION

Figure 1:
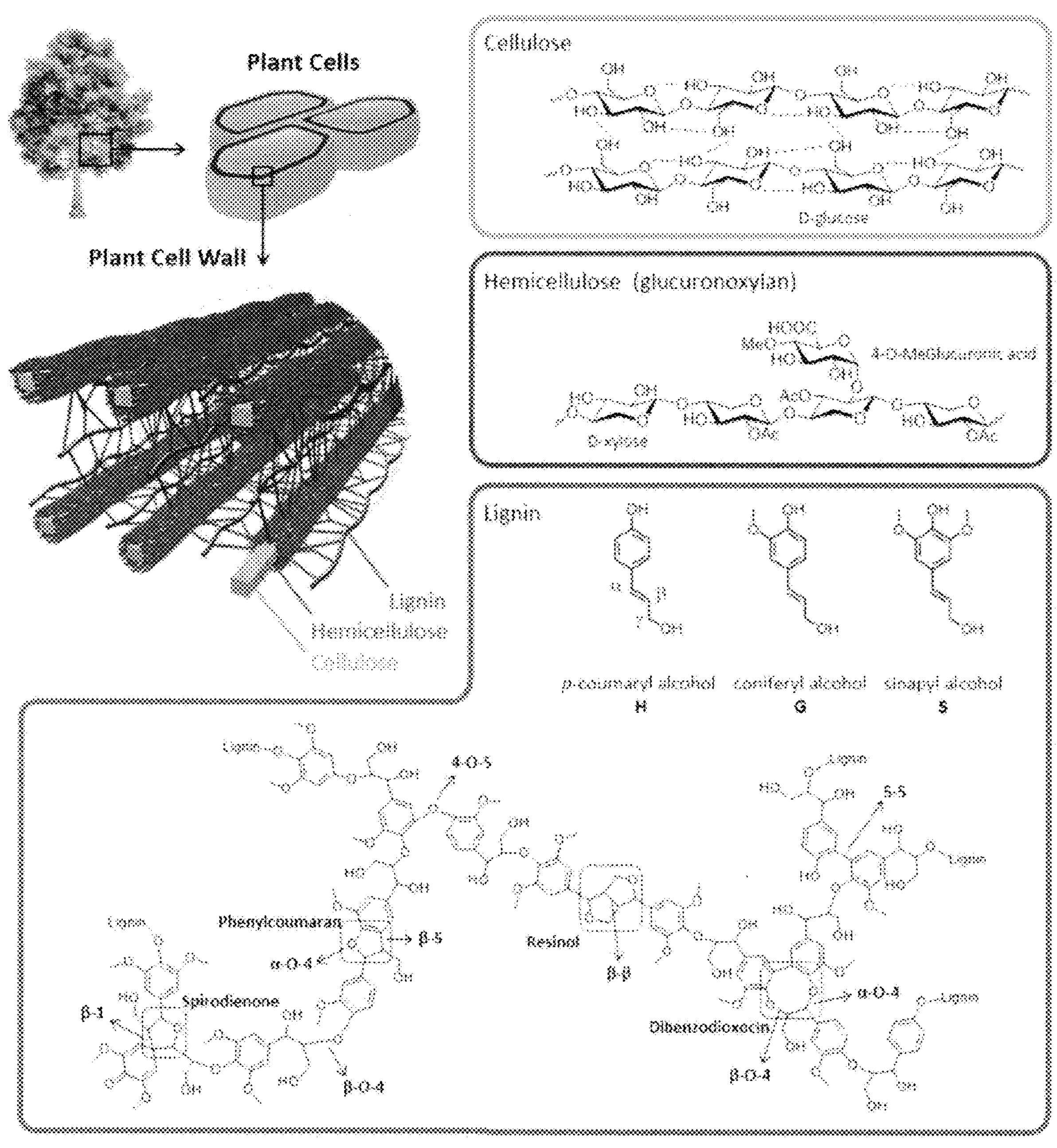
FIG. 1 is an illustration of Cellulose.

One of the most significant developments in the 21st Century is the discovery of graphene materials that now allow us the ability to vastly change the properties of our most common materials to provide superlative materials with vastly enhanced physical/mechanical, electronic, thermal, and other properties. Research to date has developed superior polymer, metal, ceramic, concrete, asphalt, fabric, and many more composite materials that are significantly changing the way that things are made. But the greatest potential still remains undone. The invention described herein is directed to wood products that are comparable in strength to steel, are non-corrosive, fire-resistant, lightweight, and pest-resistant with long-term stability that greatly exceeds today's building materials.

Scientists at the University of Maryland have fortified wood using a process that makes it twelve times stronger, producing a natural substance more durable than many titanium alloys and capable of stopping high-speed projectiles. Liangbing Hu, head of the research team at UMD's A. James Clark School of Engineering, stated in a press release, "This could be a competitor to steel or even titanium alloys, it is so strong and durable. It is also comparable to carbon fiber, but much less expensive. This new way to treat wood makes it 12 times stronger than natural wood and 10 times tougher."

The team of researchers boiled different varieties of wood in a solution of sodium hydroxide and sodium sulfite for seven hours. This process removes compounds that surround the cellulose in the wood, creating additional porous space. Researchers then pressed the now-porous block at one hundred degrees Celsius for 24 hours. This reduced the wood to one-fifth the original thickness and increased its density threefold.

A fire-retardant structural material can be made by chemically softening and compressing wood to remove spaces between cell walls. When burnt, the resulting material develops an exterior layer of char which preserves the internal strength.

The use of wood in structural applications is limited by flammability and susceptibility to rapid collapse when burned. Wood can be made more fire-proof by chemical treatments-such as through injections of halogenated flame retardants, or coatings of inorganic particles and nanoparticles—but these approaches are typically either prohibitively expensive, fail environmental and health standards, or result in an insufficient structural process to create strength. Liangbing and colleagues of the University of Maryland in the U.S. show that their bullet-proof wood via densification also confers fire-resistant properties without recourse to potentially toxic or environmentally unfriendly materials. One drawback of this material is that it's based on existing lumber structure, is a lengthy and expensive process, and is still lacking in some important mechanical properties as discussed below.

As noted above, tens of millions of acres of pine forest in North America have been killed by beetle infestation. We have no resolution to this problem at this time in that it is being spurred by global warming and will continue to devastate more of our forests. This is creating severe problems for our economy and environment. The economic issue is the reduction of forest materials that will impact our building industry, the environmental issues are more serious. Dead trees are drying out and becoming a severe threat to forest fires. As they decay the trees release sequestered CO2, thereby exasperating already severe conditions. The recently killed trees are acceptable for use in building, but as the wood ages and dries, it ceases to be useful for construction. Aged dead timber is still a valuable resource if harvested prior to rot and decay.

The problem of wild deadwood will not be resolved until an economic driver is developed that will support change through a strong profit motive. An economical model for the removal and utilization of dead timber must be developed.

The inventive material is a composite manufactured from the components of wood that will be sourced from forest and agricultural waste and their derivatives. This new material may be comprised at least primarily of cellulose, lignin, nano-cellulose, graphene, and bio-resins. The formulations of the quantities of each material used may be dependent on the end-use applications.

The composite material may also be modified with additional or alternative available materials to improve the product for end-use applications. For instance, fire resistance may be improved by the addition of flame retardants, and mold may be eliminated by the addition of a controlling agent. The products can be made impermeable to water with nano-coatings.

An additional advantage of the inventive material and process is that it will conserve trees that are currently being cut for these applications. This will have a major impact on global warming.

This new composite products may be useful in providing high-value materials. Using available timber, it may be possible to build lighter and stronger. These composite products will be made from wood material that has been enhanced with cutting-edge materials science. Compressed wood can be composited with one of the strongest materials of the modern age-Graphene and Graphene Oxide. The lignin of the wood itself can be used to supplement the production of graphene, and then be mixed back into the wood as a matrix resin.

Nanocellulose crystals and fibers are among the strongest natural materials known and are today being considered for the building of planes and automobiles. Nanocellulose matrices may be mixed with materials derived from other wood components to make the composite product, as described herein. Lignin is a substantial portion of natural wood and may be the source of both bio-resin and graphene. It is a natural polymer and is convertible to other reactive polymers, enabling rapid processing. Lignin is also a precursor for graphene and may provide that component of the product. Hemicellulose is natural glucose and is marketable for many applications. The wood components may be separated via a separation process.

Material development may follow relevant materials and processes that are currently available. The cellulose of dead tree wood may be converted to nano cellulose using a newly developed process based on submerged liquid plasma. Lignin may be solution extracted and separated, not only for use of the lignin but also to convert lignin to graphene with a thermal process to increase the physical properties of the product. This process is discussed further in the drawings.

The inventive product will be a formulation of these materials into a high-strength and processable composite molding compound. This will entail mixing together nanocellulose, graphene, and bio-resin to make a molding compound.

To convert the material into functional parts, the compound may be compression molded or pultruded, polymerizing the caprolactam to Nylon 6 (as one example) providing extraordinarily strong and rigid products. With this technology, the products produced will be recyclable, flame-resistant, and pest resistant for use in building materials replacing the unsalvageable forest products that have been destroyed by the beetles. Alternatively, it is possible to formulate the material with Epoxy, Phenolic, and Polyurea chemistry by reacting with the hydroxyl groups that are present on the nanocellulose, lignin, and graphene oxide.

It should be noted that the product and process is not limited to wood as the sole raw material for the product.

Agricultural waste (wheat chaff, corn husks, etc.) and even weeds are comprised of lignocellulose material and can be processed into a composite product as described herein.

As set forth herein, one objective is to convert dead wood and other waste biomass to "super wood" composite products. This may be accomplished by removing the constituents of the biomass and converting them through a physical and chemical process into a much more valuable product with higher strength and rigidity, and that may also be flame and pest-resistant and can be molded or pultruded into finished products.

The process for producing the composite products includes removal of nanocellulose and lignin from the biomass, and applying chemistry that will convert lignin into graphene and highly reactive bio-resin.

Phase I—Separation and Modification of Wood Composites a) Deconstructing wood products to their components of cellulose, lignin, and hemicellulose. This is like methods that have been developed for producing paper. The paper-making process damages the lignin, so a modified process must be utilized. The process is based on U.S. Pat. No. 5,739,837A. A method for separating lignocellulosic material into (a) lignin, (b) cellulose, and (c) hemicellulose and dissolved sugars. Wood or herbaceous biomass is digested at elevated temperatures in a single-phase mixture of alcohol, water, and a water-immiscible organic solvent (e.g., a ketone). After digestion, the amount of water or organic solvent is adjusted so that there is phase separation. The lignin is present in the organic solvent, the cellulose is present in a solid pulp phase, and the aqueous phase includes hemicellulose and any dissolved sugars. The products will be dried and separated for further processing. Another process that we are currently evaluating is the deconstruction of the wood or other biomass products with supercritical carbon dioxide.

b) Conversion of cellulose to nanocrystals and nanofibrils. A new process has been developed in which cellulose is placed in water and simultaneously treated with submerged plasma and ultrasound that replaces the labor-intensive and expensive process. This rapid low-cost method is shown in the accompanying drawings.

c) Conversion of lignin to graphene. This conversion is very rapid with thermal energy. We have done this in our laboratory with laser treatment and are currently evaluating Xenon Flash Lamp processing at elevated temperatures. Another process may include freeze-dried lignin with Fe thermally converted to very high-quality low-cost graphene.

d) Converting Lignin to reactive Biopolymers. Several biopolymers are currently manufactured from lignin, but due to the novelty, are all relatively expensive. However, the manufacturing of polyurethane, polyamide, and phenol resins from lignin is low-cost and straightforward.

e) Hemicellulose. The hemicellulose that is separated from cellulose and lignin is glucose materials and sugar alcohols that have commercial value in food applications. These materials will be converted to bio-resin or purified and marketed as glucose.

Phase 2 Formulation of Composite Product a) Procurement of Materials and Product Development. In order to expedite development, formulation work may begin with purchased graphene, lignin, nanocellulose, and lignin-based biopolymers.

b) Mixing of Graphene and Cellulose Nano Crystals. Nano cellulose is like graphene: a recently discovered material that is complementary to graphene as a natural surfactant that will enable graphene to be stable in a water carrier. Nanocellulose wraps around the graphene, preventing agglomeration. This allows for development of the product with higher levels of reinforcement resulting in higher strength.

c) Development of the Formulations. The Nanocellulose-graphene material described in part b) will be dried and dry mixed with lignin and the material will be mixed into the bio-resin. Samples may be made by varying each ingredient.

d) Physical Testing and Characterization. Sample Materials may be molded into test specimens and tested to determine tensile strength, modulus, elongation, impact resistance, flammability, thermal and electrical properties, and environment resistance. The characterization will Include Differential Scanning calorimeter, Thermal Galvanometric Analysis, and Scanning Microscopy.

f) Remake proven formulation with lab-produced Materials. Samples will be prepared with materials developed in Phase 1 and assessed as described in phase 2-d).

Applications for the Inventive Material

The primary application of the product is in construction as a replacement for current wood, polymer, and metal materials. It may be used in automobiles and other transport vehicles from aquatic to air; from sporting goods to armor; and to many diverse applications in rebuilding our infrastructure, the potential application of this new material is almost limitless.

Figure 6:
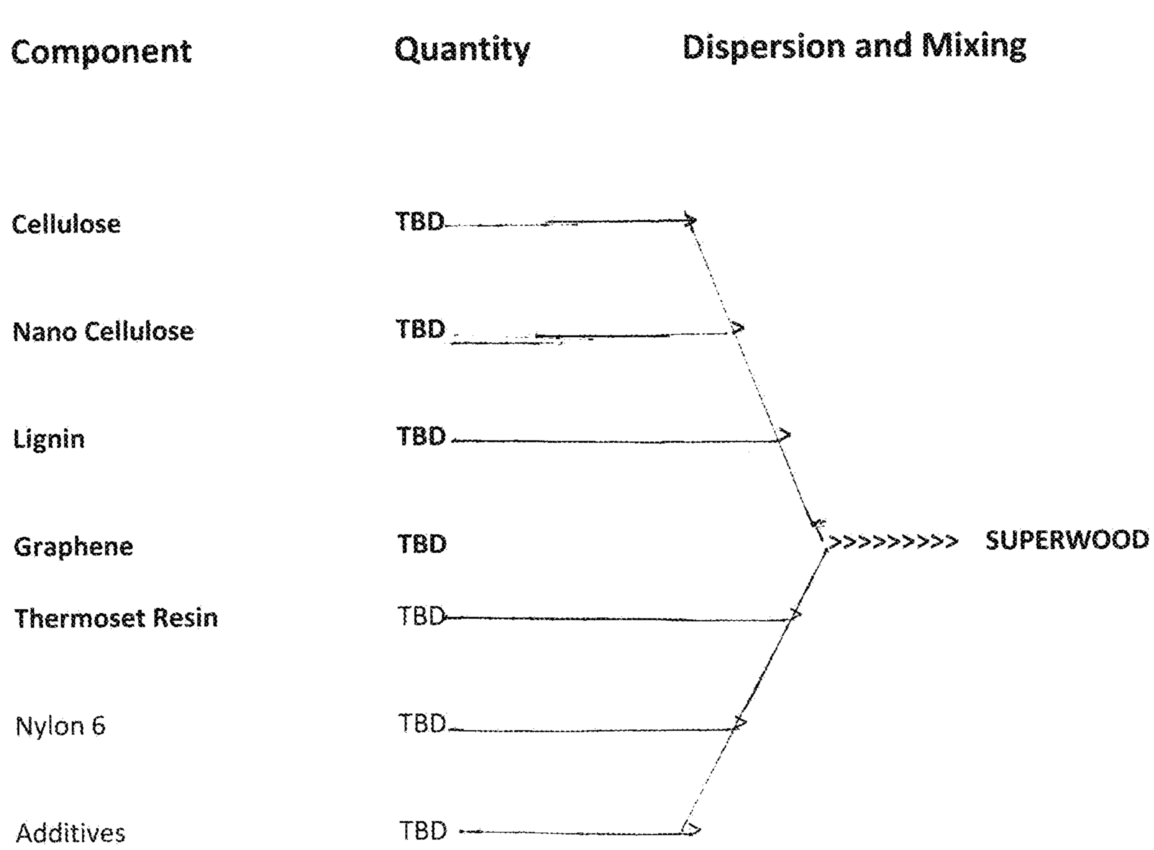
FIG. 6 generally illustrates the process of producing a composite wood material as described herein.

The composite material is capable of producing very strong yet lightweight products from waste materials that may replace a myriad of commonly used plastic, metal, and composite materials. As described herein, it is based on deconstructing waste biomass into cellulose, lignin, and, hemicellulose; and converting portions of these materials into nanocellulose, graphene, and bio-resins. The composite material may be made with cellulose, nanocellulose crystals, and fibrils; lignin, graphene; and bio-resins, as is generally illustrated in FIG. 6. These materials are mixed together using the described materials in quantities and formulations to fit end-user requirements, which may be dependent on the application.

The following exemplary methods may be used for the isolation and separation of cellulose. Isolation of cellulose and lignin from wheat straw is a two-step process. This description of isolation and separation is based on wheat straw as the raw material, as this material has comparable cellulose, lignin, and hemicellulose content to wood. The process for isolating and separating cellulose and lignin from wood would be similar, as is known to those of skill in the art.

Isolation of Cellulose as the First Step 15 g of organic waste (in this case wheat straw), 150 ml mixture of 1,4-dioxane and $H^2O$ (2:1, v/v), and H2SO4 were added into a 500 mL stainless steel autoclave. The mixture was heated at 150° C. for 6 h with 1.0 wt % H2SO4 under magnetic stirring. The solid was then collected by filtration and thoroughly washed using 30 mL mixture of 1,4-dioxane and $H_2O$ (2:1, v/v) thrice. The solid was freeze-dried for 12 h, thus yielding wheat straw cellulose.

Isolation of Lignin at the Second Step

The filtrate and washes (residual liquid) were collected and combined before adding $H_2SO_4$ until the concentration reached 1.5 wt %. The mixture was then heated at 180° C. for 1.5 h under stirring. After cooling to room temperature, the mixture was transferred into a 1000 ml beaker and 540 mL $H_2O$ were added. Lignin was then precipitated and collected via centrifugation, followed by freeze-drying for 10 h.

Conversion of Cellulose Isolated from Wheat Straw 0.5 g cellulose, 0.5 g phosphotungstic acid and 10 mL tetrahydrofuran were added into a 50 ml stainless steel autoclave. The autoclave was sealed and the air in it was flushed with 1 MPa nitrogen three times. Then 1 MPa nitrogen was introduced and the mixture was heated to 190° C. for 6 h. After cooling to room temperature, 10 mL N,N-dimethylformamide was added to the autoclave and the mixture was subsequently kept at 130° C. for 4 h under nitrogen atmosphere. The autoclave was cooled to room temperature and the pressure in it was gradually released. Solid residues were collected by filtration, washed with THF and the washes were combined with filtrate. The liquid reaction mixture was then centrifuged and quantitatively analyzed by gas chromatography (GC) and 3,5-dinitrosalicylic acid (DNS) method.

Oxidative Conversion of Lignin Isolated from Wheat Straw 1 g lignin in 50 mL 1 mol/L NaOH aqueous solution was dispersed via ultrasonic vibration before adding to a 500 mL autoclave. Then 4 mL nitrobenzene and 4.1 g $NaAlO_2$ were added. The mixture was then heated at 170° C. for 2.5 h under magnetic stirring. The reactor was quickly cooled by placing in an iced water bath for 20 min. 20 wt % hydrochloric acid was added into the reaction mixture until the pH value of 1 followed by extraction using chloroform. Monophenolic compounds in the organic soluble fraction was then quantitatively analyzed by high-performance liquid chromatography (HPLC) and high-performance liquid chromatography-mass spectrometry (HPLC-MS).

Determination and Calculation

The contents (purities) of cellulose, hemicellulose, lignin, and ash were determined according to known procedures. The determinations were based on the averages of three replicates. The yields of cellulose and lignin, the theoretical yield of lignin, and the removal rates of components, such as hemicellulose, lignin, and ash, were calculated as follows.

Figure 2:
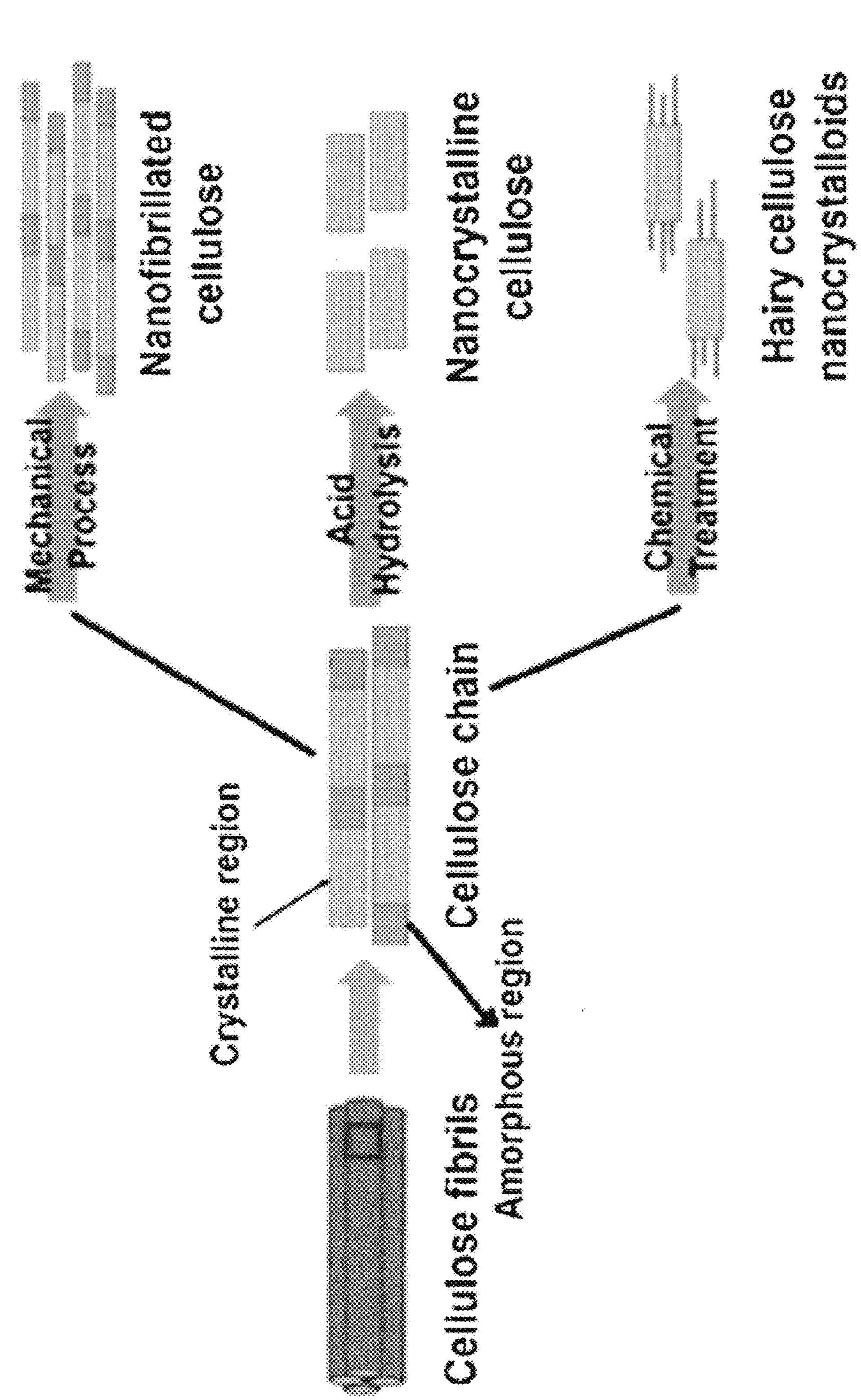
FIG. 2 illustrates the process to convert the cellulose into Cellulose Nano Crystals and Cellulose Nano Fibrils by Submerged Plasma/Ultrasonic Treatment.

The cellulose can be used as made in the construction of the composite material, but a portion of the cellulose will be converted to cellulose nanocrystals and cellulose nanofibrils. This conversion is done by processing the cellulose with a combination of submerged plasma/ultrasonic treatment (FIG. 2).

Figure 3:
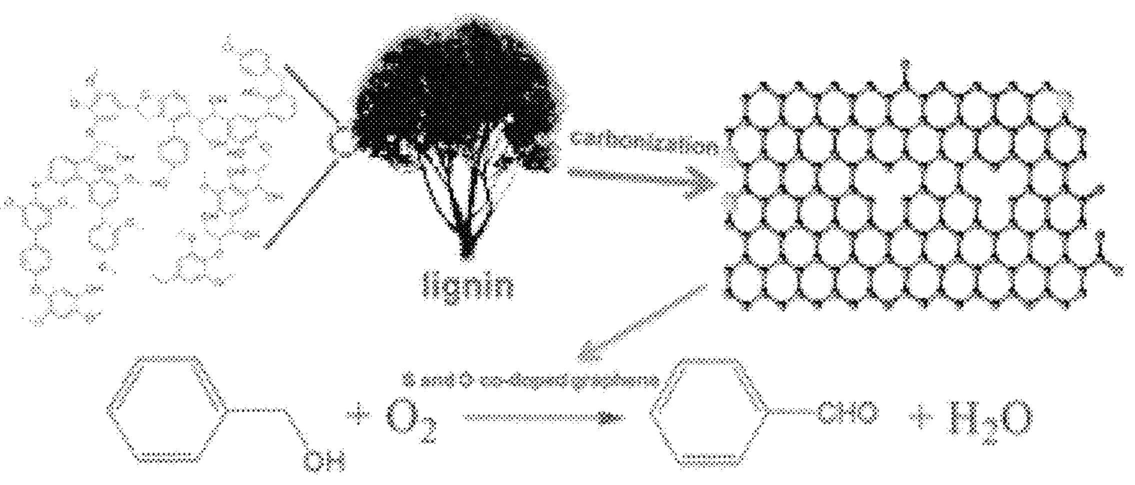
FIG. 3 is an illustration of lignin and processing to convert lignin into graphene by thermal laser processing.

Lignin is convertible to graphene by a thermal process that is as simple as scanning the dried lignin with a laser with sufficient power to heat the lignin to provide the necessary thermal heat (FIG. 3). This will require only 2 to 10% of the process lignin, with the remainder used for the manufacture of bio-resins and as an additive in the composite material.

Figure 4:
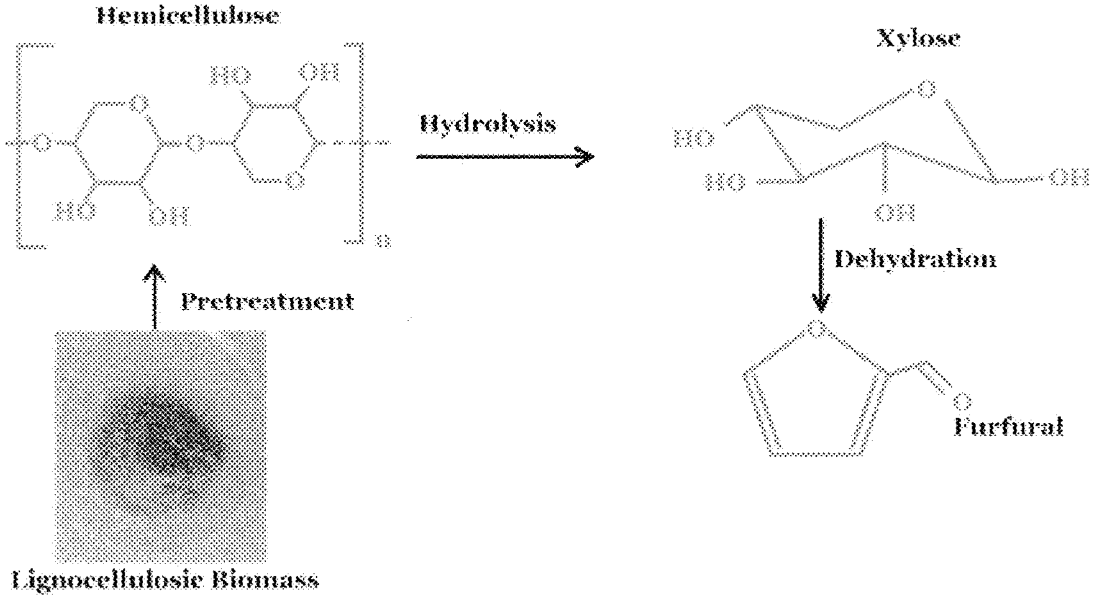
FIG. 4 is an illustration of hemicellulose.

Hemicellulose is a glucose-based material that is also convertible to bio-resin and will be used for that purpose. The resins that can be made from these materials include epoxy, polycaprolactam (Nylon 6) (FIG. 4), Poly Lactic Acid, Phenolic, and Polyurethanes. The processes for making these bio-resins are well-known and published. Different applications for the inventive composite material will of necessity be based on different resins, but initial products are based on epoxy.

The synthesis of novel epoxy resins from lignin hydrogenolysis products is reported. Native lignin in pine wood was depolymerized by mild hydrogenolysis to give an oil product that was reacted with epichlorohydrin to give epoxy prepolymers. These were blended with bisphenol A Di glycidyl ether or glycerol Di glycidyl ether and cured with diethylenetriamine or isophorone diamine.

One key novelty of this work lies in using the inherent properties of the native lignin in preparing new biobased epoxy resins. The lignin-derived epoxy prepolymers could be used to replace 25-75% of the bisphenol A Di glycidyl ether equivalent, leading to increases of up to 52% in the flexural modulus and up to 38% in the flexural strength. Improvements in flexural strength were attributed to the oligomeric products present in the lignin hydrogenolysis oil. These results indicate lignin hydrogenolysis products have the potential as sustainable biobased polyols in the synthesis of high-performance epoxy resin.

Construction of the Inventive Composite Wood From Cellulose, Lignin, Nanocellulose Crystals, Cellulose Nanofibrils, Fibrils, Graphene, and Bio-Resins As noted earlier, the composite formulations described herein may be altered for different applications, but most all of the formulations will use all of the components described above with potential variation based on use. The process is generally illustrated in FIG. 6. The components will be physically mixed together by first mixing together the graphene and nanocellulose materials. The nanocellulose is a surfactant for graphene which allows the graphene to disperse without agglomeration in subsequent steps.

The next step is combining the reserved cellulose with lignin and the bio-resin; adding the graphene/nanocellulose and milling together. For better mixing and dispersion it may be necessary to dissolve the cellulose and lignin in a supercritical water/alcohol mixture or in supercritical carbon dioxide prior to milling.

Figure 5:
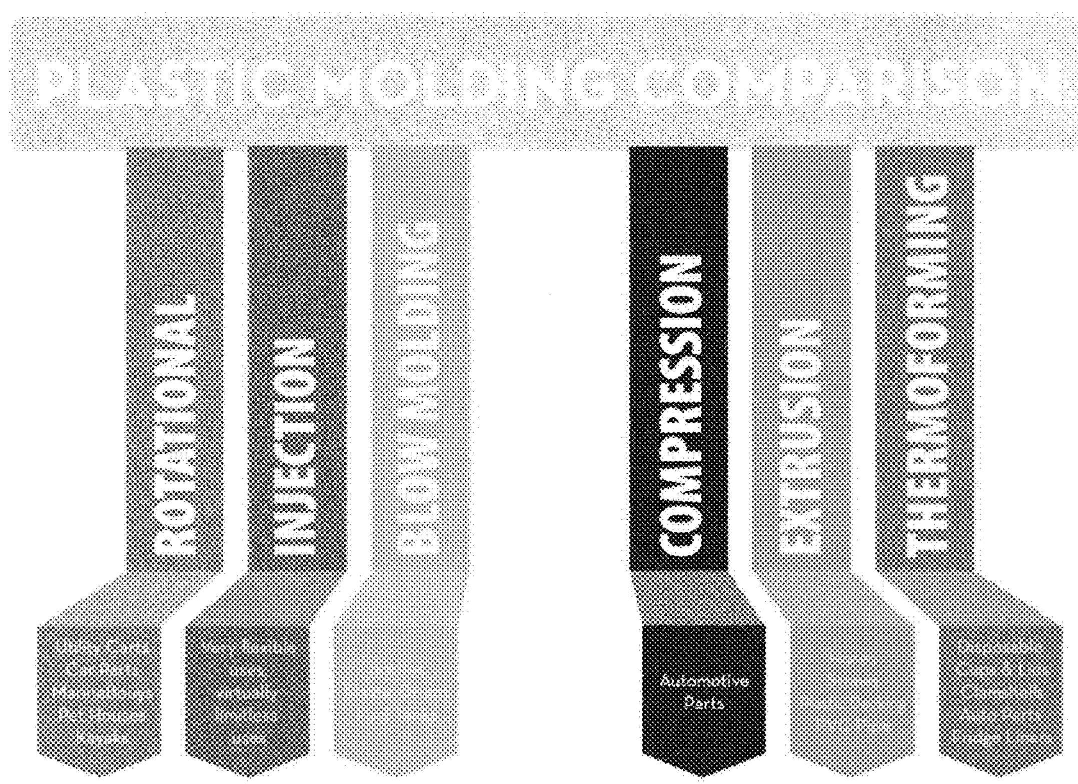
FIG. 5 is an illustration of various plastic molding options.

The ready-to-mold material is a thick paste that can be hot molded or pultruded to the final cured part. FIG. 5 illustrates various plastic molding options which may be utilized in forming useful products of the inventive composite material described herein.

Thus has been described composite biomass materials and methods and systems for making same. Many different arrangements of the various components depicted, as well as components not shown, are possible without departing from the spirit and scope of the invention. Embodiments of the invention are described with the intent to be illustrative rather than restrictive. Alternative embodiments will become apparent to those skilled in the art that do not depart from its scope. A skilled artisan may develop alternative means of implementing the aforementioned improvements without departing from the scope of the disclosure. It will be understood that certain features and subcombinations are of utility and may be employed without reference to other features and subcombinations and are contemplated within the scope of the claims. Unless indicated otherwise, not all steps listed in the various figures need to be carried out in the specific order described.

Having thus described the invention, what is claimed as new and desired to be secured by Letters Patent is:

1. A composition for forming a composite material, the composition comprising cellulose, nano-cellulose, lignin, graphene and thermoset biopolymer wherein the cellulose comprises 10-90% by weight of the composition and wherein the nano-cellulose materials comprise 0.1 to 20% by weight of the composition.

2. The composition according to claim 1, wherein the cellulose, nanocellulose, lignin, graphene, and the polymer are derived from biomass.

3. The composition according to claim 2, wherein the biomass is selected from the group consisting of wood and wheat straw.

4. The composition according to claim 1, wherein the thermoset biopolymer comprises from 2 to 70% by weight of the composition.

5. The composition according to claim 1, wherein the nanocellulose is derived from cellulose.

6. The composition according to claim 1, wherein the graphene is derived from lignin.

7. The composition according to claim 1, wherein the thermoset biopolymer is derived from lignin.

8. The composition according to claim 1, wherein the thermoset biopolymer is derived from hemicelluloses.

9. The composition according to claim 1, further comprising a flame retardant.

10. The composition according to claim 1, further comprising a mold retardant.

11. The composition according to claim 1, further comprising a waterproof polymer coating.

* * * * *